United States Patent [19]
Beyer

[11] 3,807,794
[45] Apr. 30, 1974

[54] LUMBAR SUPPORT MECHANISM

[75] Inventor: Gerald E. Beyer, Lathrup Village, Mich.

[73] Assignee: Ford Motor Company, Dearborn, Mich.

[22] Filed: Dec. 29, 1972

[21] Appl. No.: 316,323

[52] U.S. Cl. ............................................ 297/284
[51] Int. Cl. .............................................. A47c 3/00
[58] Field of Search ....................... 297/284; 297/89

[56] References Cited
UNITED STATES PATENTS

| 855,656 | 6/1907 | McNamara et al. | 297/284 |
| 3,106,423 | 10/1963 | Schwarz | 297/284 |

FOREIGN PATENTS OR APPLICATIONS

| 809,734 | 3/1959 | Great Britain | 297/284 |

Primary Examiner—James C. Mitchell
Attorney, Agent, or Firm—John J. Roethel; Keith L. Zerschling

[57] ABSTRACT

A lumbar support mechanism for a seat backrest having a frame structure covered by a cushion. A laterally extending shaft means supports a pressure member for swinging movement about the shaft means axis. A reversible power means coupled to the shaft means is operable to vary the pressure applied by the pressure member to the underside of the cushion to control the degree of lumbar support experienced by a seat occupant.

1 Claim, 4 Drawing Figures

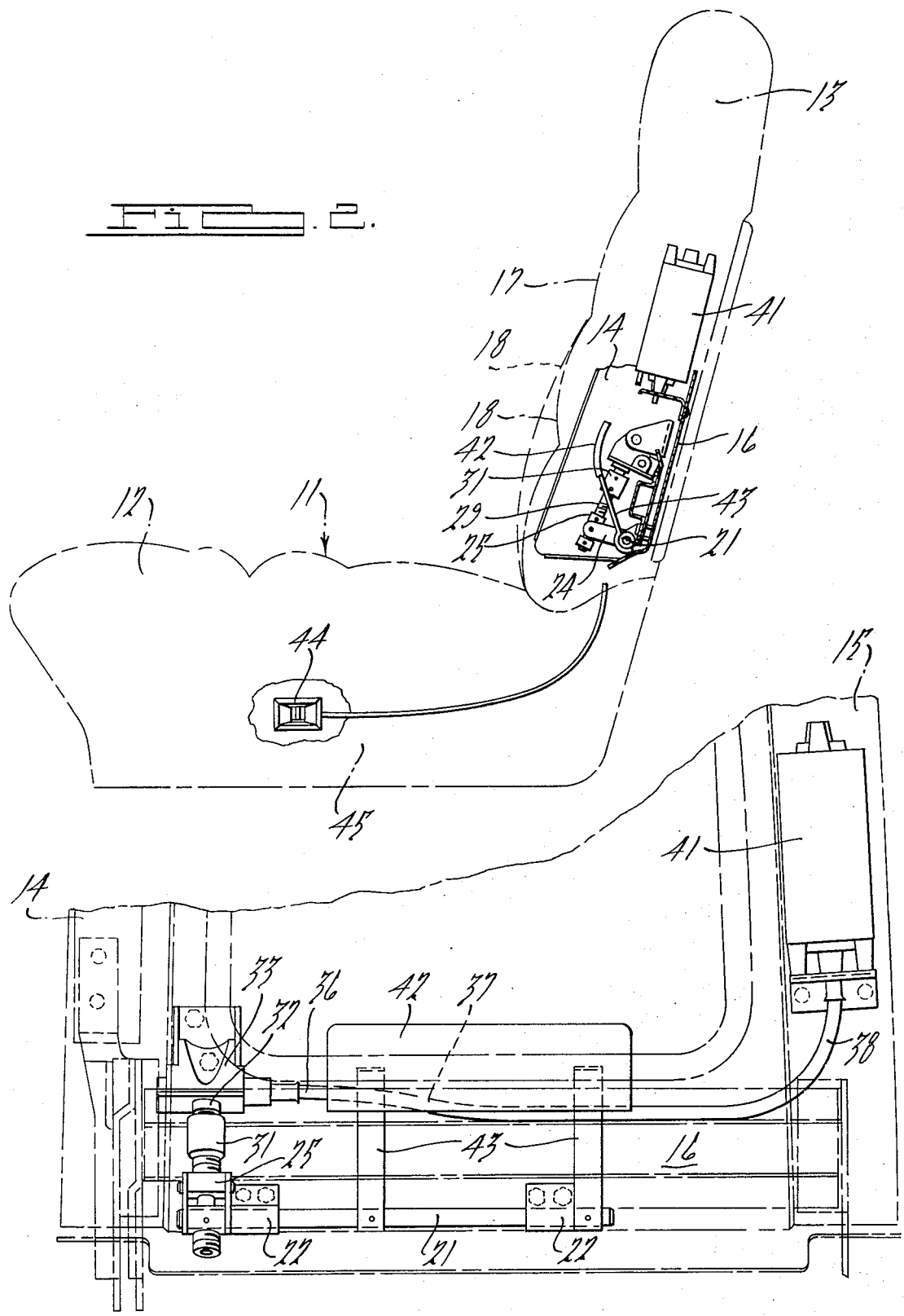

LUMBAR SUPPORT MECHANISM

BACKGROUND OF THE INVENTION

Seat backrests incorporating manually operable mechanical devices for permitting adjustment of the lumbar support area of the backrest are known. These devices operated to change the curvature or the degree of protrusion of the backrest cushion thereby to permit the seat occupant to change the pressure exerted by the backrest against the lower back.

One objection to many of the prior art manual designs is that the lumbar pressure mechanism cannot be adjusted conveniently by the seat occupant when he is in the vehicle seat. A further objection is that the operator, particularly if he is the vehicle driver, must divide his attention between the task of operating the mechanism and controlling the vehicle. For this reason, such mechanical devices as window raising and lowering mechanisms and seat position adjusters are power driven since the act of moving a switch requires much less muscular effort and is less distracting than the act of turning a crank or rotating a knob.

It is an object of the present invention to provide a power driven lumbar support mechanism that may be packaged within a seat backrest.

SUMMARY OF THE INVENTION

The present invention relates to a lumbar support mechanism for a seat backrest having a frame structure comprising a pair of spaced, upright side frame members joined at their base by a frame member extending laterally of the upright frame members and a cushion supported on the frame structure. The lumbar support mechanism comprises a shaft means paralleling the laterally extending frame member and journalled for rotation thereon. A pressure or paddle member supported on the shaft means is engageable with the inner side of the cushion. A power drive means is supported on the backrest frame structure and is coupled to the shaft means. The drive means is operable to directionally rotate the shaft means to swing the paddle or pressure member transversely of the shaft means axis whereby the pressure exerted by the paddle or pressure member on the cushion may be selected to control the degree of lumbar support experienced by a seat occupant.

DESCRIPTION OF THE DRAWINGS

Further features and advantages of the present invention will be made more apparent as this description proceeds, reference being had to the accompanying drawings, wherein:

FIG. 2 is a side elevation of a vehicle seat illustrating the orientation of the lumbar support mechanism within the seat backrest;

FIG. 4 is a frontal elevation of FIG. 1.

DETAILED DESCRIPTION OF THE INVENTION

Figure 1:
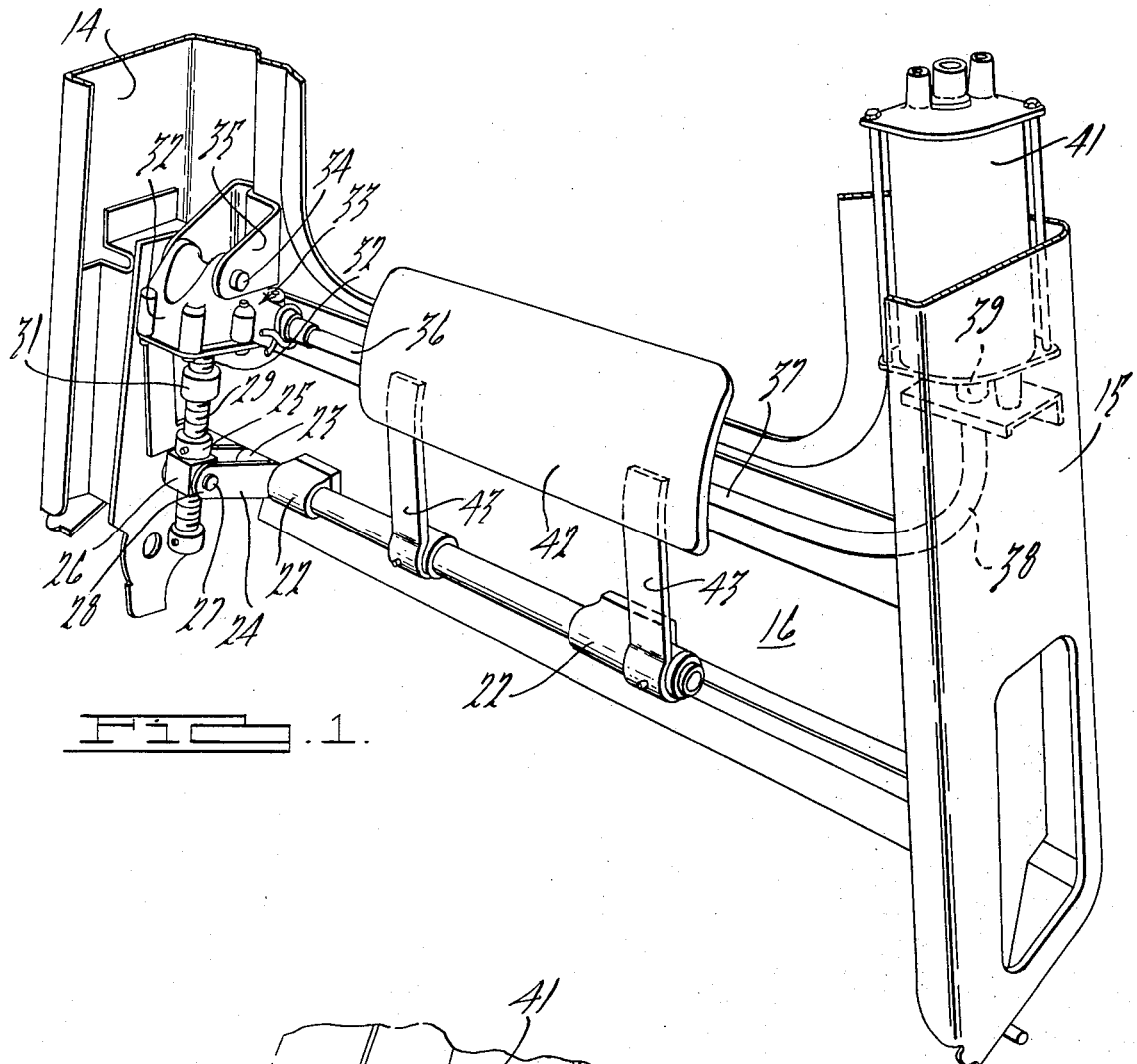
FIG. 1 is an enlarged perspective view of the lumbar support mechanism embodying the present invention.

Referring now to the drawings, there is illustrated in FIG. 2 a vehicle seat, generally designated 11. The seat 11 comprises a base cushion 12 and an upright backrest 13. The backrest comprises upstanding side frame members 14 and 15 joined at their base by a laterally extending panel or frame member 16, see FIG. 1. The frame members are covered by an elastomeric cushion 17 which may be all foam rubber or conventional sinuous spring and foam rubber construction.

The lower portion 18 of the backrest, that is, the portion extending upwardly from the intersection of the backrest 13 with the seat cushion 12 to one-fourth to one-third of the way up the backrest, may be considered to be the lumbar support area of the backrest. This is the area of the backrest which supports the lower back portion of an occupant of a vehicle seat. Because of differences in back curvature from individual to individual and because of the sag in a particular individual's muscle resulting from sitting in a seat over a long period of time, it is necessary and desirable that the outward curvature or protrusion of the lumbar support area of the backrest be adjustable to insure the comfort of the individual seated in the vehicle seat.

According to the present invention, this variable or adjustable lumbar is achieved through operation of a lumbar support mechanism, generally designated 19 and shown in enlarged detail in FIG. 1.

The lumbar support mechanism 19 comprises an elongated shaft 21 journalled in bearing devices 22 mounted on the panel or frame member 16, the shaft 21 being rotatable about a substantially horizontal axis paralleling the panel or frame member 16. At its left end 23 as viewed in FIGS. 1 and 2, the shaft 21 is coupled to a clevis crank arm 24 which carries a travelling nut 25 supported in a nut housing 26 pivotedly coupled by pivot studs 27 to the ends 28 of the clevis crank arm 24.

The travelling nut 25 travels on rotatable screw 29 which is coupled by a coupling sleeve 31 to the output shaft 32 of a reduction gear unit 33. The reduction gear unit 33 is pivotally suspended by a pivot pin 34 from a bracket 35 mounted on the backrest 13 adjacent the side frame member 14. The input shaft (not shown) of the reduction gear unit 33 is coupled to one end 36 of a flexible drive cable 37. The other end 38 of the drive cable is coupled to the output shaft 39 of an electric motor 41.

The shaft 21 carries a pressure plate or paddle member 43 which is elongated in a 42 paralleling the shaft 21. The pressure plate or paddle member is arcuate in vertical cross section, about an axis spaced above the shaft 21 axis, for a purpose to become apparent. The pressure plate or paddle member 42 is supported above the shaft 21 on spaced spring arms 43.

The electric motor 41 is a reversible motor actuated by a two-way switch 44 mounted in any convenient location such as in the side of the base cushion support 46.

Figure 3:
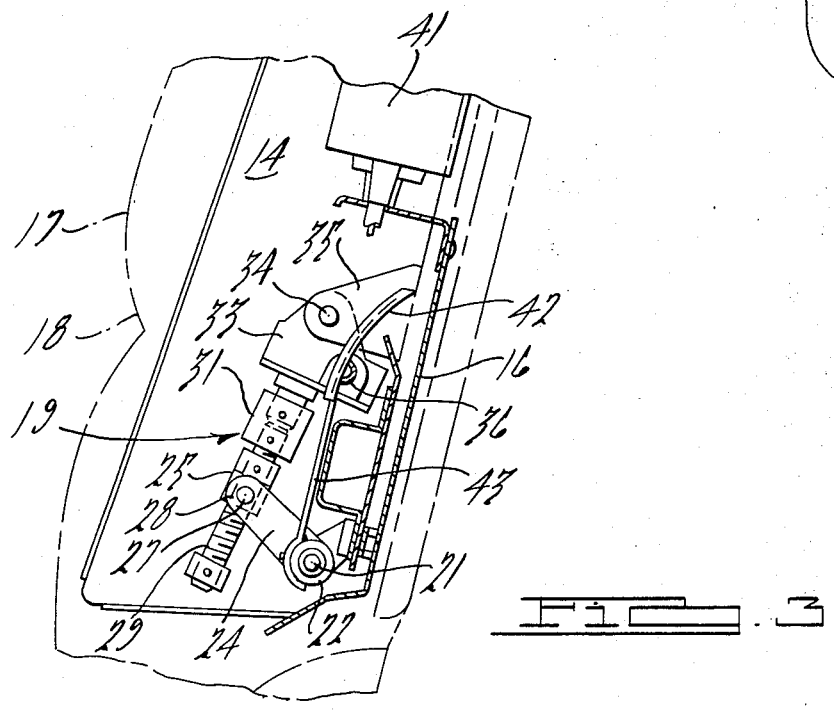
FIG. 3 is a view in part similar to FIG. 2 on a slightly enlarged scale illustrating parts of the mechanism in a second operative position.

As shown in FIG. 3, the lumbar support mechanism 19 is in its inoperative position in which the pressure plate 42 is back against the rear panel 16 of the backrest 13. In this position, no pressure is exerted by the pressure plate 42 on the inner or underside of the cushion 17. If it is desired to cause the lumbar support area 18 of the cushion to project outwardly or away from the back panel 16 of the backrest 13, the motor 41 may be actuated to rotate the screw 29 in a direction to cause the nut 25 to travel away from the reduction gear unit 33 (or downwardly as viewed in the drawings). This movement of the nut 25 is transmitted through the crank arm 24 to the shaft 21 causing the pressure plate 42 to be swung away from the back panel 16 into engagement with the underside of cushion 17. Movement of the pressure plate 42 is substantially to the maximum position shown in FIG. 2 with the lumbar area 18 of the cushion 17 being bulged out as shown in dotted outline. Because of the curvature of the pressure plate 42 it maintains a substantially smooth tangential relationship with the underside of cushion 17.

The convenience factor of the switch actuated adjustable lumbar support mechanism will be readily apparent as will be the ease with which the mechanism may be packaged in a vehicle seat strusture.

It is to be understood that the invention is not limited to the exact construction illustrated and described above, but that various changes and modifications may be made without departing from the spirit and scope of the invention defined by the following claims.

I claim:

1. A lumbar support mechanism for a seat backrest comprising a pair of spaced, upright side frame members joined at their base by a frame member extending laterally of the upright frame members and a cushion supported on the frame structure, the lumbar support mechanism comprising:

a laterally extending shaft means paralleling the laterally extending frame member and journalled for rotation thereon, a paddle member supported on spring arm means above the shaft means in spaced relation to the latter for bodily swingable movement, motor drive means supported on the backrest structure and coupled to the shaft means, the motor drive means comprising a drive screw engaged with a travelling nut supported on a crank arm extension of the shaft means, the drive screw being coupled by a power transmission unit to a motor means, the power transmission means comprising a reduction gear unit, the reduction gear unit being positioned adjacent one side frame member and the motor means being positioned adjacent the other side frame member with only the paddle member positioned centrally of the seat backrest, a flexible cable means coupling the reduction gear unit to the motor means, the paddle member being arcuate about a lateral axis to provide substantially tangential contact with the inner side of the cushion as the paddle member is bodily swung about the shaft means axis, the motor drive means being operable by the motor means to directionally rotate the shaft means to swing the paddle means to control the pressure exerted by the paddle means on the cushion and thereby the degree of lumbar support experienced by a seat occupant.

* * * * *